June 26, 1956 F. DICK 2,751,629
PROCESS OF RESHAPING PLASTIC MATERIALS
Filed Dec. 11, 1953 2 Sheets-Sheet 1

INVENTOR.
FRANKLIN DICK
BY
Greene, Pinela & Durr
ATTORNEYS

June 26, 1956   F. DICK   2,751,629
PROCESS OF RESHAPING PLASTIC MATERIALS
Filed Dec. 11, 1953   2 Sheets-Sheet 2

INVENTOR.
FRANKLIN DICK
BY
Greene, Pinelis & Dunn
ATTORNEYS

2,751,629

PROCESS OF RESHAPING PLASTIC MATERIALS

Franklin Dick, New York, N. Y., assignor to Richard A. Fisch, Long Island City, N. Y.

Application December 11, 1953, Serial No. 397,583

6 Claims. (Cl. 18—59)

This invention relates to a process for molding strip plastic material about shaped articles of metal, wood and similar materials and to the preliminarily formed plastic strip material for use with such process.

It has been proposed heretofore to provide tubular bodies made of cellulose derivatives in the wet swollen state which can be inserted over bottle tops, etc., and which will shrink onto the bottle top to tightly seal the same upon drying.

Among the objects of this invention is to provide a process of producing unusually shaped plastic products from preformed plastic strip material such as tubes, tapes, etc., which can be readily formed by extrusion. It is among the objects of this invention to provide a tubular or similarly shaped body of dry thermoplastic material which can be caused to shrink onto a smaller body and form a tight, adherent protective cover for said body.

Among other objects of the invention is to provide a molded body which is not affected by exposure to air, which can be shipped or transported without changing its properties and yet which can be treated to cause it to shrink upon a desired body of smaller size.

These objects and others ancillary thereto are obtained by forming tubular and similar linear products from a thermoplastic material containing a plasticizer, fitting or clamping the shaped plastic on a form or on the body to be covered extracting the plasticizer by treating in an organic solvent solution which simultaneously swells the product and extracts the plasticizer, and drying the resultant body whereupon the thermoplastic material shrinks onto the form or body to be covered. In about the proportion that the plasticizer is extracted by the solvent, the plastic material shrinks to the shape of the body to which it is clamped or about which it surrounds, for example, if all the plasticizer is extracted from a tube containing 18% of plasticizer, the tube will shrink approximately 18% on drying.

Any of the known plasticizers may be employed, it being necessary, of course, to employ a solvent which dissolves the plasticizer and swells the thermoplastic material. The plasticizers are added in amounts of 2–50% depending on the amount of shrinkage desired in the plastic product. The more plasticizer that is added the greater will be the shrinkage obtainable in the product.

In addition to the extractable plasticizers which will be dissolved by the solvent in the extracting bath, additional plasticizers which are insoluble in the bath may be added to give the extracted and shrunken product desired flexibility. However, it is usually easier to regulate the time of treatment in the extracting bath to obtain the desired proportion of plasticizer in the final product. Where curved, twisted or bent metal rods are desired the metal rods may be covered with a thermoplastic tube while substantially straight and then curved, bent or twisted to the desired configuration after the covering is completed. In such cases the covering tube is allowed to retain a certain proportion of its plasticizer. Even when the covering body is substantially freed from plasticizer, the covered body can be bent without injuring the tube by applying heat to soften the thermoplastic material.

The thermoplastic tubes or coverings employed may be made of any of the known thermoplastics, for example, the organic derivatives of cellulose, such as cellulose acetate, cellulose acetate butyrate, cellulose acetate propionate, cellulose butyrate, cellulose propionate, ethyl cellulose, etc.; the vinyl resins such as polyvinyl acetate, polyvinyl chloride, polyvinyl carbazole, polyvinylidene chloride, copolymers of such vinyl resins; polystyrene; polyethylene; polyisoprene; polybutylene, etc. The thermoplastic material should be present in the original composition in the proportion of 30–95%. The organic derivatives of cellulose are the preferred materials.

Various pigments, fillers, dyes, stabilizers, etc., can be added to the compositions to provide clear transparent, colored transparent, translucent or opaque covering materials. Fillers and pigments can be added in amounts of from 0 to 35%.

Another phase of the invention is based on the discovery that very hard products may be made by the process. Where very little plasticizer is allowed to remain in the strip material, the result is to produce on drying a very hard product whereas by the use of the plasticized composition all of the advantages connected with the extrusion of plasticized mixes are obtained for forming the original strip material. Thus, the process can be used for the production of self-supporting irregularly shaped plastic bodies of varying degrees of hardness by forming the strip material on a core body of the desired shape and removing the core after the shrinking step.

The preferred extracting liquid comprises ordinary ethyl alcohol. Ethyl alcohol is readily available, relatively non-toxic, and acts as a solvent for most plasticizers. Ethyl alcohol is also capable of swelling the cellulose derivative bodies and the swelling and extracting ability of the ethyl alcohol can be regulated by adding water thereto. The time for extracting the plasticizer will vary depending on the amount of plasticizer to be extracted which in turn may depend on the amount of plasticizer the body contains and the degree of shrinkage desired. Immersions of from 1 minute to several hours have been employed. Although action of the alcohol or other solvent on the bodies is referred to as a swelling action no substantial increase in dimensions of the body necessarily takes place during the extraction step, i. e., the alcohol or solvent may only replace plasticizer in the body so that the body itself retains approximately the original dimensions. The shrinkage takes place on the final drying step.

One unexpected result is that there is no limit to the thickness of the thermoplastic material. Thicker bodies require a somewhat longer extraction time but nevertheless substantially uniform and/or complete extractions may be obtained with the thick bodies.

The invention, both as to its organization and its method of operation together with additional objects and advantages thereof will best be understood from the following description of specific embodiments thereof when read in connection with the accompanying drawing in which—

Figure 1:
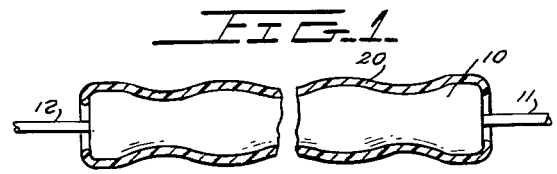
Fig. 1 is a view of a covered product made according to the invention.

The object shown in Fig. 1 comprises a wooden handle 10 connected to metal rod members 11 and 12. Such handles may be used on baby carriages, for example, and in the ordinary process of manufacture are heavily lacquered. These handles have irregular or wavy surfaces which nevertheless can be tightly fitted with a casing of thermoplastic material 20 according to the process of the invention.

Figure 2:
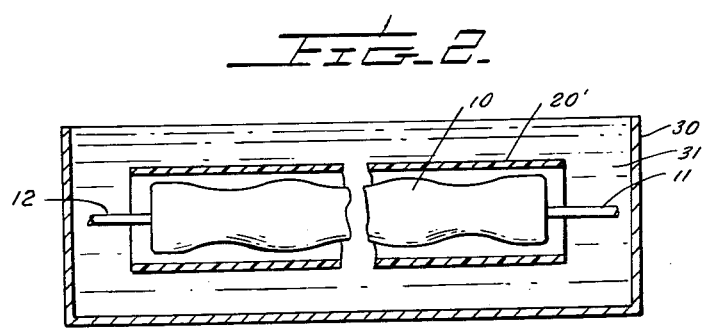
Fig. 2 is a view illustrating how the product of Fig. 1 is made.

In order to produce the covered article of Fig. 1 the thermoplastic tubular film or pellicle 20' is formed, as by extrusion, from a composition containing the thermoplastic material and including 3–50% of plasticizer. Since the plasticizer is substantially non volatile, the tube 20' has all the appearances of an ordinary tube and can be shipped, stored or handled as an ordinary extruded tube. The tube 20' is thereafter fitted over the handle 10, to be covered as shown in Fig. 2, and the assembly is then immersed in the organic bath 30 containing organic solvent 31. As the solvent extracts the plasticizer the tube 20 remains substantially the same size as before but it becomes clammy and spongy. It might be considered possible to insert core body 10 after treating the tube in bath 31 but this would be a very difficult operation since the tube in which plasticizer has been removed or replaced by solvent is spongy, lacks tensile strength and rigidity and would be very difficult to work with so that it is a distinct advantage to be able to insert the form while the tube 20' is self supporting, strong, otherwise easy to handle.

After the plasticizer is extracted or replaced the combination is removed from bath 30 and dried. No special drying means is necessary as air drying is usually sufficient as illustrated in Fig. 3.

Figure 3:
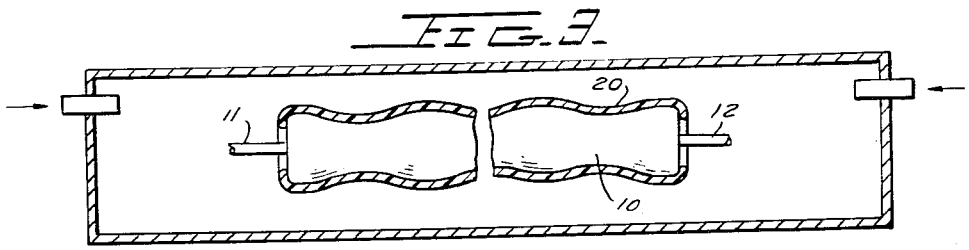
Fig. 3 is a view illustrating a further step in the production of the product of Fig. 1.

Although a handle similar to those used on baby carriages is employed to illustrate the process in Figs. 1–3 it is obvious that many other objects may be covered by the same process such as wooden chair legs whether square, triangular, polygonal, round or irregular cross sectional shape, metal rods such as used for the manufacture of furniture, etc., handlebars for bicycles, etc., handles for tools, frames whether metal, wood or composition material such as picture frame material, various decorative strip material, etc. The covering provides a decorative coating which at the same time protects the body which it covers so that enameling, chromium or nickel plating, galvanizing, and/or polishing is eliminated. The covering also provides a heat insulating layer which is especially advantageous when metal rods are to be employed in the manufacture of furniture, for example.

Figure 5:
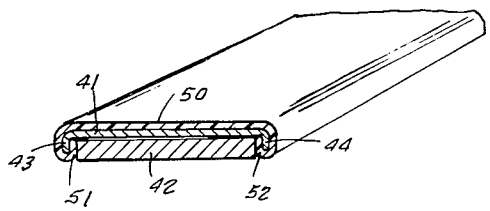
Fig. 5 is a view illustrating another type of product made according to the invention.

The invention is not limited to the production of products which are completely covered. As shown in Fig. 5 the covering 50 may be applied to the outside portion of the channel member 41. The plasticizer containing member 50 is applied to the channel member 41 and the ends 51 and 52 of the cover 50 are clamped against the side portions 43 and 44 of the channel member 41 by the member 42. Upon soaking the assembly in alcohol or other solvent solution, the plasticizer is extracted and on drying a tight fit of the cover 50 over the member 51 is obtained.

Figure 6:
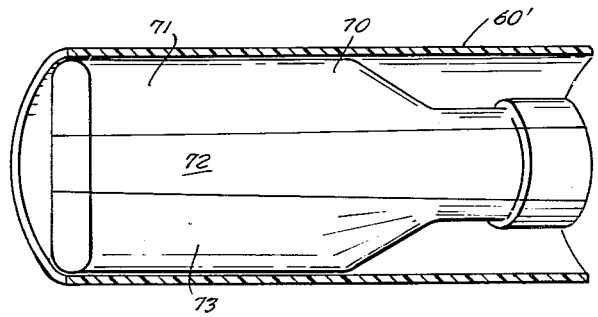
Figs. 6–8 are views similar to Figs. 1–3 but show how a self supporting hard article of thermoplastic material may be formed from the strip material of the invention.
Figure 7:
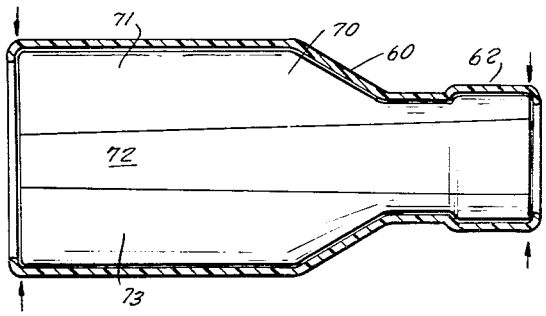
Figure 8:
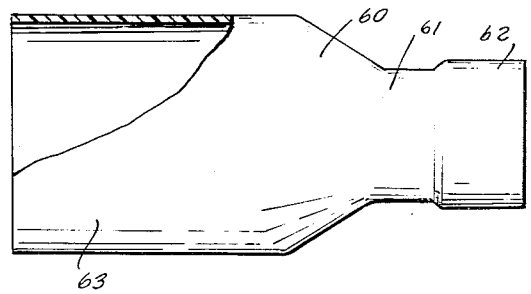

Figs. 6–8 show how a self supporting plastic body of irregular shape may be formed from a tube formed by a simple extrusion process. The final product 60 illustrated in Fig. 8 is a nozzle similar to some used in vacuum cleaner attachments having a neck section of substantially circular cross sectional shape with a slightly enlarged end portion 62, and a nozzle section 63 with a stretched and flattened oval shape. Such products are difficult to make, requiring skilled labor. According to this invention the core member 70 having three (3) parts 71, 72 and 73 is inserted in tube 60', the tube is shrunk onto the core member 70 by leaching out the alcohol soluble plasticizer and after drying and removing the overlapping or inwardly projecting end portions of the shrunken tube, the central core section 72 is removed from the end 62 permitting the other members 71 and 73 to be removed. The product can not only be accurately shaped but can also be made very hard since it can be obtained without any substantially amount of plasticizer content.

Figure 4:
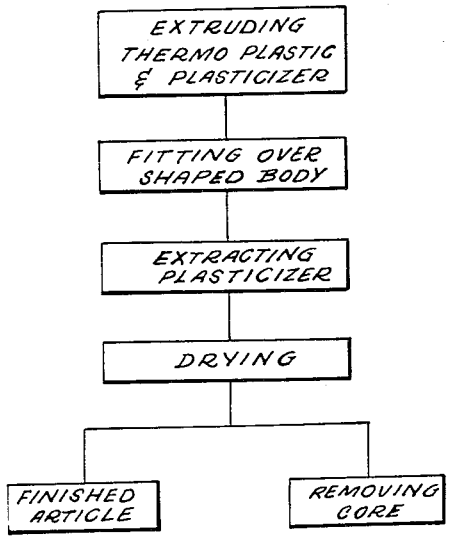
Fig. 4 is a flow sheet of the steps of the process of the invention.

The following example illustrates exactly how the process as outlined in the flow sheet of Fig. 4 is carried out.

Example 1

A composition is formulated by thoroughly mixing the following ingredients in the proportions set forth:

|  | Per cent |
|---|---|
| Cellulose acetate butyrate | 84 |
| Dibutyl sebacate | 15 |
| Pigment or dye | About 0.1 |
| Tartaric acid (stabilizer) | About 0.1 |

This composition is extruded into the form of a tube having an internal diameter of about 0.53" and a thickness of about .025".

The resultant tube has all the appearance of an ordinary tube and can be stored or shipped as desired without changing its properties.

At any time thereafter the tube is fitted about a rod having a diameter of about 0.5", the internal diameter of 0.53 of the tube permitting easy insertion of the rod into the tube, and the assembly is then soaked in alcohol for about 10 minutes until a substantial portion of plasticizer is extracted or replaced by alcohol. Upon drying, whereupon the tube shrinks tightly onto the rod.

Example 2

The process is conducted as in Example 1 except that 30% of the plasticizer is employed. The resultant tube has greater shrinkage and a sufficient amount of the plasticizer to provide the shrinkage required can be removed in a shorter time, for example, 3 minutes.

Example 3

The process is conducted as in Example 1 or 2 except that 19% of dibutyl recinoleate is employed as the plasticizer. If a hard product is required soaking for 2–3 hours will remove substantially all of the plasticizer to produce a very hard product.

Example 4

A product similar to that shown in Figs. 6–8 is obtained by extruding a tube of cellulose acetate of approximately 2½ inches in diameter containing 15% of dibutyl ricinoleate. The tube is shaped by shrinking onto a form similar to that shown in Figs. 6–8 by the steps illustrated in Fig. 4. Since the plasticizer is leached from the cellulose acetate in the process, the product obtained when the core is removed contains no substantial amount of plasticizer and has approximately the maximum obtainable hardness for a cellulose acetate product.

The features and principles underlying the invention described above in connection with specific exemplifications will suggest to those skilled in the art many other modifications thereof. It is accordingly desired that the appended claims shall not be limited to any specific feature or details thereof.

I claim:

1. In a process of making a hard thermoplastic material, the steps comprising providing a pellicular body of thermoplastic material which is substantially free of volatile solvent liquids and containing 3–50% of a plasticizer which is soluble in a volatile organic solvent which does not dissolve the thermoplastic material, fitting the pellicular body about an object which is substantially the same size but smaller than the pellicular body, treating the pellicular body while fitted on said object in a leaching bath comprising a volatile organic solvent in which the plasticizer is soluble but in which the thermoplastic material is not soluble, removing the object and pellicular body from the leaching bath and drying the pellicular body whereby the pellicular body shrinks onto the object about which it is fitted to form a layer of the thermoplastic material of increased hardness thereon due to the loss of plasticizer from the original pellicular body.

2. The process as set forth in claim 1 in which the pellicular body is of tubular shape.

3. The process as set forth in claim 1 in which the thermoplastic material is an organic ester of cellulose, the plasticizer is an alcohol soluble plasticizer and the leaching bath is an alcohol bath.

4. The process as set forth in claim 3 in which the pellicular body is of tubular shape and is made by extruding a composition which is substantially free of volatile liquids.

5. The process as set forth in claim 3 in which the plasticizer is substantially completely removed from said pellicular body to form a layer of said organic ester of cellulose of maximum hardness.

6. The process as set forth in claim 1 in which the object about which the thermoplastic pellicular material is fitted, is of varying cross sectional shape and comprising the steps of removing the said object from the pellicular material after the latter has been shrunk onto said object.

References Cited in the file of this patent

UNITED STATES PATENTS

| | | |
|---|---|---|
| 1,998,356 | Brown | Apr. 16, 1935 |
| 2,027,962 | Currie | Jan. 14, 1936 |
| 2,338,787 | Ushakoff | Jan. 11, 1944 |
| 2,512,490 | Drish et al. | June 20, 1950 |
| 2,565,316 | Lucas et al. | Aug. 21, 1951 |